United States Patent [19]

Frizot et al.

[11] Patent Number: 4,694,585

[45] Date of Patent: Sep. 22, 1987

[54] DEVICE FOR MEASURING CLEARANCE AROUND A PIN FOR CENTERING THE UPPER INTERNAL EQUIPMENT OF A PRESSURIZED WATER NUCLEAR

[75] Inventors: Alain Frizot, Montcenis; Gerard Cadaureille, Saint Bonnet de Mure; Jean-Christophe Lalére, Lyons; Jean-Yves Machuron, Le Creusot, all of France

[73] Assignee: Framatome, Courbevoie, France

[21] Appl. No.: 895,984

[22] Filed: Aug. 14, 1986

[30] Foreign Application Priority Data

Aug. 14, 1985 [FR] France .................. 85 12398

[51] Int. Cl.⁴ ............................. G21C 17/00
[52] U.S. Cl. ...................... 33/502; 376/245; 376/260; 33/544
[58] Field of Search ............. 376/249, 258, 248, 245, 376/260; 33/502, 542, 543, 544

[56] References Cited

U.S. PATENT DOCUMENTS 4,197,652  4/1980  Qurnell et al. ............... 376/245
4,421,715 12/1983  Gunter et al. ................ 376/260

FOREIGN PATENT DOCUMENTS 0063225 10/1982  European Pat. Off. .
2368118  5/1978  France .
2551199  3/1983  France .

Primary Examiner—Deborah L. Kyle
Assistant Examiner—Daniel Wasil
Attorney, Agent, or Firm—Pollock, Vande Sande & Priddy

[57] ABSTRACT

Device for measuring clearance around a pin for centering the upper internal equipment of a pressurized water nuclear reactor comprising a carrier (b) fixed integrally to a pedestal (7) which makes it possible to fix on the upper plate of the reactor core (1) two travellers (15) which are parallel to the plate (1), two slides mounted to move on the travellers, resilient means (22) for returning the slides and a marking assembly carried by the carrier. Each slide comprises a sensing finger (30) projecting downwards relative to the bearing face of the pedestal (7) and a planar marking plate (31). The marking assembly comprises two styli (33), each directed towards a marking plate (31). A control system (34) makes it possible to compress springs (36) whose force is applied to the styli (33). The clearance measurement can be carried out from a distance and under water.

4 Claims, 1 Drawing Figure

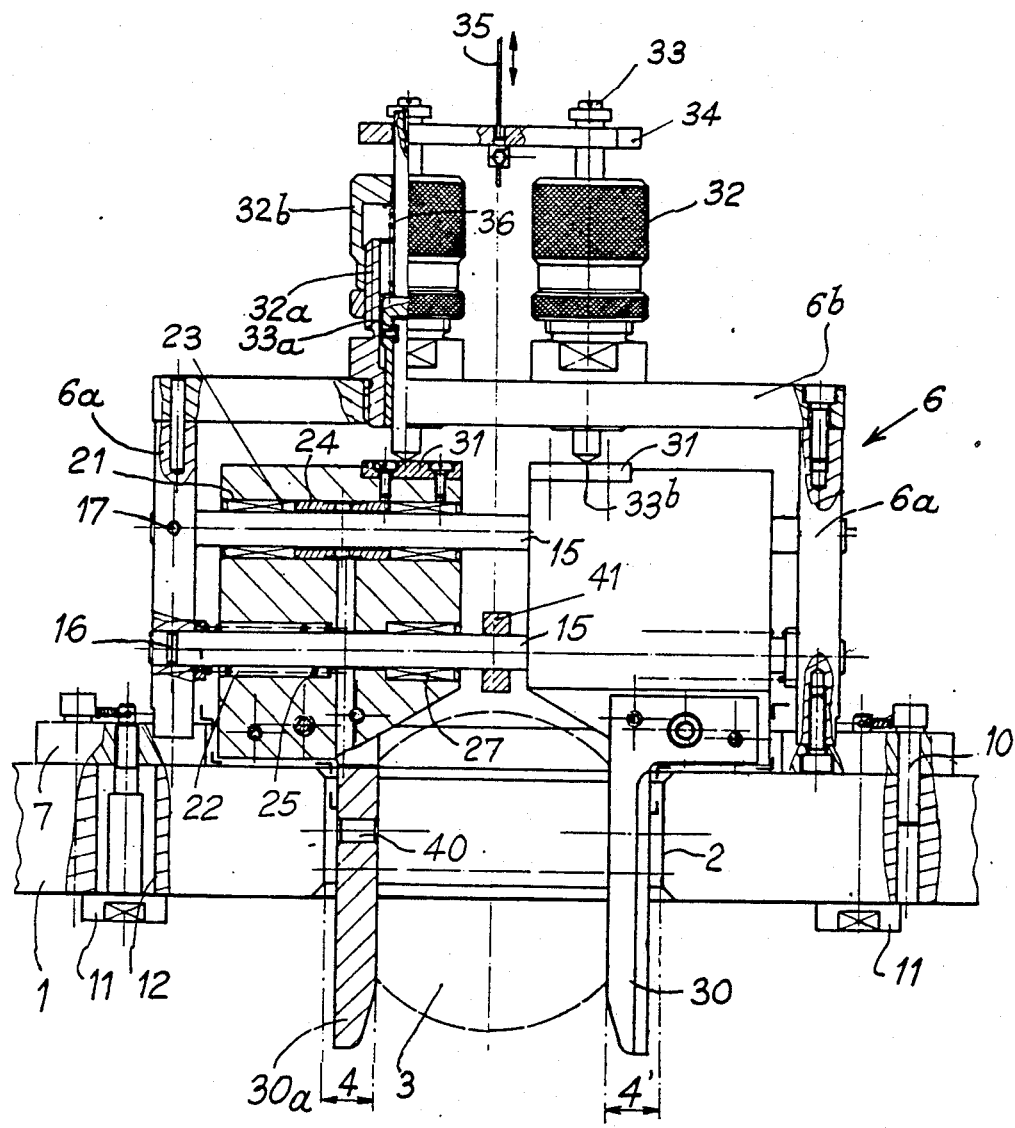

DEVICE FOR MEASURING CLEARANCE AROUND A PIN FOR CENTERING THE UPPER INTERNAL EQUIPMENT OF A PRESSURIZED WATER NUCLEAR

FIELD OF THE INVENTION

The invention relates to a device for measuring clearance around a pin for centering the upper internal equipment of a pressurized water nuclear reactor on the lower internal equipment placed in the reactor vessel which is open and full of water.

BACKGROUND OF THE INVENTION

Pressurized water nuclear reactors have a vessel with the reactor core arranged therein and supported and maintained in the vessel by an assembly of components forming part of the lower internal equipment. Arranged above the core is the upper internal equipment which includes, in particular, the upper core plate and the guide tubes for the reactor control rods.

The installation of the upper internal equipment on the lower internal equipment must be carried out in an extremely precise manner, especially since it determines the proper operation of the reactor control rods. These control rods are introduced downwards into some core assemblies, by virtue of guiding members in the guide tubes of the upper internal equipment, which are aligned with the guide tubes for the fuel assemblies receiving the control rods.

The lower internal equipment comprises a cylindrical core-support shell with a vertical axis, with some of the upper internal equipment and especially the upper core plate engaged therein. At the time when the upper internal equipment is fitted onto the lower internal equipment, its centering must be ensured in a highly accurate manner and provision is made for four centering pins, integrally attached to the core support shell and arranged on its inner surface, at 90° to each other, together with slots in the core support plate, at locations which correspond to those of the centering pins. The entry of the centering pins into the slots at the time when the upper internal equipment is installed on the lower internal equipment enables it to be centered.

When a nuclear reactor is being built, the operations of installing the upper internal equipment on the lower internal equipment are carried out in a workshop, and this operation, which requires a great deal of care, does not, however, present special difficulties, since it is relatively easy to gain access to all the parts of the internal equipment which are being adapted and fitted.

For the repair and maintenance of nuclear reactors which have already operated it has been proposed to change completely the upper internal equipment, in the event where this equipment may have been subjected to wear or distortions in service. The irradiated lower internal equipment is then kept in the vessel and new upper internal equipment is adapted onto the irradiated internal equipment remaining in the vessel. For this purpose, the vessel is opened and filled with water, and the various checks which enable the new upper internal equipment to be adapted onto the irradiated lower internal equipment must be carried out from a distance, for example from the platform associated with the devices for assembling the upper internal equipment, above the upper part of the nuclear reractor vessel opening out into the pool.

To facilitate the adaptation of the new upper internal equipment to the irradiated lower internal equipment which may have undergone a slight distortion, the clearance between the slots in the upper core plate and the corresponding centering pins is increased. This increased initial clearance enables the upper internal equipment to be introduced without the risk of jamming, and then to be installed while the perfect alignment of the guide tubes is monitored.

The relative position of the slots and of the centering pins must then be accurately known, in order to machine with very great accuracy the adapters which are fixed onto the upper core plate in the region of the slots and which enable the clearance between the slots and the centering pins to be returned to the required value.

So far there has been no known device permitting the measurement of clearances around the pins for centering the upper internal equipment of a pressurized water nuclear reactor with very high accuracy, from a distance and under water.

The object of the invention is therefore to offer a device for measuring clearance around a pin for centering the upper internal equipment of a pressurized water nuclear reactor on the lower internal equipment placed in the reactor vessel which is open and full of water, the lower internal equipment comprising the reactor core enclosure on which the centering pins are fixed, and the upper internal equipment comprising the upper core plate in which slots which correspond to the centering pins are machined, this device being capable of permitting an extremely accurate measurement of clearance between the centering pins and the slots in the upper core plate, when the upper internal equipment is installed on the lower internal equipment remaining in the vessel, especially in the case where the irradiated lower internal equipment requires the measurements to be carried out from a distance.

To this end, the measuring device according to the invention comprises:

(a) a carrier integrally attached to a pedestal equipped with means intended to cooperate with holes in the upper core plate for fixing the carrier onto the upper core plate;

(b) at least two travellers mounted in the carrier and parallel to the bearing surface of the pedestal which is placed on the upper face of the upper core plate;

(c) two movable slides mounted on the two travellers, each carrying a planar marking plate parallel to the direction of travel of the slides and each equipped with a sensing finger projecting downwards relative to the bearing face of the pedestal;

(d) resilient means, mounted inside the carrier, for returning the slides to bring them back towards each other in the direction of the travellers; and (e) a marking assembly carried by the carrier and comprising two styli mounted in guidance carriers directed at right angles to the marking plates, each placed opposite a marking plate and pushed by a spring towards these plates, and a control equipment fixed integrally to the styli and to a control cable, whose end away from the control equipment enables a pull to be applied to separate the styli from the plates, while each of the return springs is compressed, while the styli mark the plates when the cable is released.

BRIEF DESCRIPTION OF THE DRAWINGS

In order that the invention may be more clearly understood, a description will now be given, by way of example, and with reference to the attached drawing, of an embodiment of a measuring device according to the invention.

DESCRIPTION OF PREFERRED EMBODIMENT

The drawing FIGURE is a partly sectioned elevation view of a measuring device according to the invention in position on the upper core plate forming part of the upper internal equipment of a pressurized water nuclear reactor.

The drawing shows the upper core plate 1 of the internal equipment comprising, at a location on its periphery, a slot 2 intended to house a centering pin 3, whose section in a vertical plane is shown in the FIGURE by broken lines. A large initial clearance 4 is provided between the slot 2 and the centering pin 3, to facilitate the installation of the upper internal equipment including the core plate 1 on the lower internal equipment to which the centering pin 3 is fixed.

The device according to the invention, indicated generally by reference 5, enables the clearances 4 and 4', situated on either side of the pin 3, to be measured accurately and from a distance after the upper internal equipment has been installed on the irradiated lower internal equipment remaining in the vessel and under water.

The device 5 comprises a carrier 6 integrally attached by its lower part to a pedestal 7, which is associated with centering studs 10 engaged in holes in the upper core plate and with screws 11, which pass through the upper core plate via holes 12 and are fixed by screwing into the pedestal 7. These devices which are associated with the pedestal 7 enable it to be fixed in an accurate position on the upper core plate 1, in the vicinity of the slot 2.

The carrier 6 comprises two vertical uprights 6a and a plate 6b, parallel to the bearing surface of the pedestal 7. The components 7, 6a and 6b of the carrier 6 are assembled rigidly together by means of screws 13.

Mounted inside the carrier 6 are two travellers 15, consisting of shafts fixed in the carrier 6 parallel to the bearing surface of the pedestal 7. These shafts include grooves such as 16 in their end part and screws 17 which enable them to be locked in position in the uprights 6a of the carrier 6.

When the measuring device is in position on the upper core plate of the upper internal equipment, itself placed on the lower internal equipment, the plate 6b and the travellers 15 are in a horizontal position.

Slides are mounted movably on the travellers 15, inside the carrier 6. Each of the slides comprises an upper transverse opening 21 and a lower transverse opening 22.

Two ball-bearing rings 23, separated by a space 24 and arranged around the corresponding traveller 15, are placed in the upper opening 21 of each of the slides. This produces a low-friction sliding mounting of the slide on the traveller.

The lower transverse opening 22 comprises two parts which have different diameters and which are separated by a bearing rim. A return spring 25 which bears on one of the uprights 6a around the traveller 15 is arranged in one of the parts of the opening. A ball-bearing ring 27 is placed in the other part of the opening.

The springs 25 of the two slides which bear on the opposite uprights 6a enable the two slides to be brought back towards each other, in the direction of their travel along the travellers 15.

Each of the slides carries a sensing finger 30 in its lower part and a marking plate 31 in its top part, parallel to the travellers 15 and to the bearing face of the pedestal 7.

The sensing fingers 30 comprise an end part 30a whose inner surface slopes to facilitate the entry of the sensing finger into the clearance 4 (or 4') between the centering pin 3 and the slot 2, when the measuring device is installed with the upper internal equipment.

The sensors 30 project downwards outside the pedestal 7, which comprises a central opening coming into position above the slot 2 in the working position of the device 5. The thickness of the sensing fingers 30 is markedly smaller than the magnitude of the initial clearance 4 or 4'.

Mounted on the upper plate 6b is the marking assembly which comprises tow carrier sleeves 32 forming the components which guide the two marking styli 33 whose upper part, which comprises a head which serves as a stop, is integrally attached to a stirrup 34 which serves as the equipment which controls the styli 33; the stirrup 34 is integrally attached to the lower end of a control cable 35.

The sleeves 32 carrying the styli consist of a tapped ring 32a with a vertical axis and fixed to the upper plate 6b. Fixed on each of the rings 32a is a cap 32b which comprises a central opening permitting the upper part of the corresponding stylus 33 to pass. A helical spring 36 is arranged around each of the styli 33 and is compressed between the cap 32b and the widened bearing part 33a of the stylus 33. The styli 33 are thus pushed by the springs 36 towards the marking plates 31.

The cable 35, fixed to the stirrup 34 which serves as the equipment controlling the styli, passes over a set of return pulleys, (not shown), which impart to it a horizontal path and then a vertical path along a structure whose base is fixed relative to the upper core plate and whose upper part is in the region of the footbridge associated with the device for handling the upper internal equipment. A device for locking the cable is arranged at the platform. The cable is initially locked in a position which ensures that the styli 33 are lifted, so that their lower marking part 33b is in a lifted position relative to the marking plates 31. When the cable-locking device is released by means of an operating handle situated at the footbridge of the device for handling the upper internal equipment, the styli move downwards, under the effect of the thrust of the springs 36, to come into contact with the marking plates 31, on which they leave an impression in a position which corresponds to the horizontal position of the slides relative to the carrier 6.

A packed hole 40 is provided in each of the sensing fingers 30 to permit the entry and the screwing in of a gauge consisting of a threaded stem incorporating a knurled head. These means enable the device to be calibrated by placing the sensing fingers 30 in contact with the sides of the slot 2 and then by releasig the movable equipment of the styli to make a first imprint corresponding to the most widespread position of the fingers inside the slot 2.

We shall now describe a clearance measurement operation carried out with the device according to the invention on the new upper internal equipment placed on the irradiated lower internal equipment kept under water in the nuclear reactor vessel.

As a preliminary step, various measuring devices including four devices for measuring clearance around the centering pins, of the type described above, are mounted on the upper internal equipment arranged on a dry rig. These deivces are placed on the upper core plate in the vicinity of each of the slots 2 with which this plate is provided. The positioning of the device-carriers is ensured by the centering studs 10 and their fixing in position by means of the screws 11. The sensing fingers 30 are then introduced into the slot 2 in the upper core plate and the device is calibrated by placing the fingers 30 into their position of maximum separation, in which they abut against the sides of the slot 2. The position chosen as the origin is then marked by unlocking the cable 35 the upper part of which is fixed to the handling and measurement platform, above the dry rig which holds the upper internal equipment. The springs 36 then cause the styli 33 to descend and place their marking point(s) 33b in contact with the marking plates 31. The imprints corresponding to the origin position of the slides are thus made.

The upper internal equipment is then conveyed by a handling device, such as a handling tripod, from the dry rig to the reactor vessel containing the lower internal equipment. The clearance measuring devices are conveyed with the upper internal equipment, together with, insofar as the part shown in the drawing is concerned, the device for guiding and controlling the cable 35 which is fixed between the upper core plate and the platform associated with the handling device for the upper internal equipment.

When the upper internal equipment is being installed, the sensing fingers 30, which are initially pushed back towards each other by the springs 22, are moved apart by the pin 3 with the planar side faces of this pin, as shown in the drawing. When the upper internal equipment has been placed in position, the position of the slides represents the relative position of the slots in the upper core plate and of the centering pin. The cable 35 is then unlocked and the marking plates 31 are marked under water and from a distance.

The original positions of the imprints and the positions of the imprints produced under water, when the upper internal equipment is installed on the lower internal equipment, are compared when the internal equipment is taken out from the vessel again and placed back in its dry storage station. This comparison provides a highly accurate measurement of the clearances 4 and 4' on either side of the centering pin 3. Adapters whose shapes and sizes are accurately determined to reduce the clearances 4 and 4' to their required final values can thus be machined.

When the device is not located on a centering pin, the two slides are pushed back towards each other by the springs 22 until these slides come into abutment on a stop ring 41 which maintains a certain distance between these two slides.

Thus, the device according to the invention makes it possible to measure, in a highly accurate manner and from a distance, clearances between a centering pin on the irradiated lower internal equipment of a nuclear reactor, which is kept under water in the reactor vessel, and the slots in an upper core plate of the upper internal equipment which is being added to this irradiated lower internal equipment.

The invention is not limited to the embodiment which has been described. Thus, other means for controlling the stirrup for maneuvering the marking styli from a distance by means of a cable, can be employed. It is also possible to use any method of locking the end of the cable remote from the styli, to keep these styli in a high position above the marking plates. The travellers which guide the slides can be implemented in any form and the sliding bearings can be constructed differently from those described. The return of the slides or of the styli can be produced by using resilient means other than helical springs.

Lastly, the invention applies equally well to the adaptation of new upper internal equipment onto irradiated lower internal equipment and to the fitting of the internal equipment of a new nuclear reactor when it is being constructed.

What is claimed is:

1. Device for measuring clearance around a pin (3) for centering the upper internal equipment of a pressurized water nuclear reactor on the lower internal equipment, placed in the reactor vessel which is open and filled with water, the lower internal equipment comprising the reactor core enclosure to which centering pins (3) are fixed, and the upper internal equipment comprising the upper core plate (1) in which slots (2) corresponding to the centering pins (3) are machined, characterized in that is comprises:
   a carrier (6) integrally fixed to a pedestal (7) equipped with means (10, 11) intended to cooperate with holes (12) in the upper core plate (1) for fixing the carrier (6) on the upper core plate (1),
   at least two travellers (15) mounted in the carrier (6) and parallel to the bearing surface of the pedestal (7) which is placed on the upper face of the upper core plate (1),
   two movable slides mounted on the two travellers (15), each carrying a planar marking plate (31) parallel to the direction of movement of the slides (20) and each equipped with a sensing finger (30) projecting downwards relative to the bearing face of the pedestal (7),
   resilient means (25) for returning the slides to bring them back towards each other, in the direction of the travellers (15) and mounted within the carrier (6),
   and a marking assembly carried by the carrier (6) and comprising two styli (33) mounted in guiding carriers (32) directed at right angles to the marking plates (31), each placed facing a marking plate (31) and pushed towards the plate (31) by a resilient means (36), and a control equipment (34) conected to the styli (33) and to a control cable (35) whose end away from the control equipment (34) enables a pull to be applied to separate the styli (33) from the marking plates (31), by compressing each of the pushing means (36), the styli moving to mark the plates (31) when the cable (35) is released.

2. Measuring device according to claim 1, characterized in that the travellers (15) consist of cylindrical shafts around which are placed ball-bearing rings (23 to 27) placed in holes (21, 22) passing through the slides.

3. Measuring device according to claim 1, characterized in that the fingers (30) include a part which is made narrower at their end which projects outside the pedestal (7).

4. Measuring device according to claim 1, characterized in that the control cable (35) passes over return pulleys and through a vertical guiding structure which brings its end away from the control equipment (34) to the level of a handling footbridge situated above the nuclear reactor vessel.

* * * * *